(12) United States Patent
Inai et al.

(10) Patent No.: US 8,241,803 B2
(45) Date of Patent: Aug. 14, 2012

(54) METHOD OF ACTUATING FUEL CELL SYSTEM AND FUEL CELL SYSTEM

(75) Inventors: Shigeru Inai, Saitama (JP); Hiromichi Yoshida, Saitama (JP); Ryo Jinba, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1316 days.

(21) Appl. No.: 11/654,146

(22) Filed: Jan. 16, 2007

(65) Prior Publication Data

US 2007/0166577 A1   Jul. 19, 2007

(30) Foreign Application Priority Data

Jan. 16, 2006  (JP) ................... 2006-007641

(51) Int. Cl.
*H01M 8/04* (2006.01)
(52) U.S. Cl. ....................................... 429/429
(58) Field of Classification Search .......... 429/13
See application file for complete search history.

(56) References Cited

U.S. PATENT DOCUMENTS

| | | | | |
|---|---|---|---|---|
| 5,290,641 A | * | 3/1994 | Harashima | 429/431 |
| 5,798,186 A | * | 8/1998 | Fletcher et al. | 429/13 |
| 6,329,089 B1 | * | 12/2001 | Roberts et al. | 429/429 |
| 6,696,192 B2 | * | 2/2004 | Kanai et al. | 429/414 |
| 6,821,658 B2 | * | 11/2004 | Acker et al. | 429/431 |
| 2003/0077487 A1 | * | 4/2003 | Roberts et al. | 429/13 |
| 2003/0190512 A1 | * | 10/2003 | Takahashi et al. | 429/25 |
| 2005/0053810 A1 | * | 3/2005 | Kato et al. | 429/13 |
| 2005/0112418 A1 | * | 5/2005 | Roberts et al. | 429/13 |

FOREIGN PATENT DOCUMENTS

| | | |
|---|---|---|
| JP | 2002-313388 | 10/2002 |
| JP | 2003-297399 | 10/2003 |
| JP | 2005-32587 | 2/2005 |
| JP | 2006-526271 | 11/2006 |
| JP | 2006-351506 | 12/2006 |

OTHER PUBLICATIONS

Japanese Office Action for Application No. 2006-007641, dated Jan. 10, 2012.

* cited by examiner

*Primary Examiner* — Ula C Ruddock
*Assistant Examiner* — Jacob Marks
(74) *Attorney, Agent, or Firm* — Nelson Mullins Riley & Scarborough LLP; Anthony A. Laurentano (57) ABSTRACT

A method of actuating a fuel cell system equipped with a fuel cell is disclosed. The fuel cell system is supplied with reaction gases for generating electricity. The method includes the steps of: a first step for actuating the fuel cell in a low-temperature actuation mode to thereby warm up the fuel cell, if a low-temperature actuation condition is satisfied at a start-up of the fuel cell; and a second step for drying a membrane electrode assembly of the fuel cell, if a power generation capacity of the fuel cell is lower than a predetermined power generation capacity.

7 Claims, 10 Drawing Sheets

METHOD OF ACTUATING FUEL CELL SYSTEM AND FUEL CELL SYSTEM

CROSS REFERENCE TO RELATED APPLICATIONS

This application claims the foreign priority benefit under Title 35, United States Code, § 119(a)-(d) of Japanese Patent Application No. 2006-007641, filed on Jan. 16, 2006 in the Japan Patent Office, the content of which is hereby incorporated by reference.

BACKGROUND OF THE INVENTION

The present invention relates to a method of actuating a fuel cell system and a fuel cell system implementing this method.

In recent years, extensive research and development works have been undertaken for a polymer electrolyte fuel cell (PEFC; hereinafter referred to as a fuel cell FC), in which hydrogen is supplied to the anode and oxygen is supplied to the cathode to generate electricity by an electrochemical reaction therebetween. Fuel cells have been widely adapted to various applications such as a fuel cell vehicle driven by generated power of the fuel cell, and a household power supply, and the extent of the applications will be growing in the future with great expectations.

In order to make such a fuel cell generate electricity in a better condition to thereby obtain a sufficient output power, it is necessary to warm up the fuel cell quickly and to keep the fuel cell at a temperature where the fuel cell operates in a better condition (approximately 70° C. in the case of PEFC). Japanese Laid-open Patent Application No. 2003-297399 (paragraphs [0052]-[0074]; FIG. 1) discloses to start up the fuel cell, if the temperature of the fuel cell is lower than a certain temperature (e.g., 0° C.), in a low-temperature actuation mode in which the flow rate of the coolant is decreased to accelerate the warm-up of the fuel cell, instead of starting up in the normal actuation mode. It should be noted that starting up the fuel cell in this low-temperature actuation mode is so-called low-temperature actuation.

MEA (Membrane Electrode Assembly) which forms the fuel cell has an electrolyte membrane (solid polymer electrolyte membrane). In order to ensure proton mobility (diffusibility), it is necessary to keep the electrolyte membrane of the MEA in a wet condition. For this reason, a reaction gas (hydrogen/oxygen) to be supplied to the fuel cell is humidified when necessary. When the fuel cell generates electricity, water is generated at the cathode and part of the generated water migrates to the anode through the electrolyte membrane.

Since the anode and the cathode are formed by a porous member such as carbon paper, part of the humidifying water or the generated water may be pooled in voids (gaps), which are passages for a reaction gas, leading to a decrease in the output power of the fuel cell.

There has been proposed a technique for purging the fuel cell, for instance, after the fuel cell stops the power generation (generation of electricity) to stand by for the next actuation of the fuel cell. In this technique, a purging gas is supplied to the fuel cell so that the purging gas purges the fuel cell. Herein, the purging gas is a gas for purging out water from the fuel cell having an MEA. For example, air or nitrogen is used as the purging gas. The term "purge" or "purging" indicates to purge out water from the fuel cell using the purging gas.

However, in general, water presented in the anode or the cathode of an MEA, which is formed by a porous member such as carbon paper, is hardly removed by purging. Therefore, in order to purge out (remove) moisture from the MEA, namely, to dry the MEA, etc., it is necessary to prolong the time required for purging after the fuel cell stops the power generation. This leads to an increase in operation time of the compressor, etc. to supply the purging gas over an extended time period, so that the operation noise will be a problem.

Further, in order to operate the compressor over an extended time period after the fuel cell stops the power generation, the size of the external power source has to be enlarged. As a result, the system becomes enlarged in size.

In view of the above, the present invention seeks to provide a method of actuating a fuel cell system, which can decrease the time required for purging after the fuel cell stops the power generation without enlarging the size of the system, and a fuel cell system implementing this method.

SUMMARY OF THE INVENTION

According to one aspect of the present invention, there is provided a method of actuating a fuel cell system equipped with a fuel cell, to which reaction gases are supplied for generating electricity, the method comprising the steps of: a first step for actuating (driving) the fuel cell in a low-temperature actuation mode to thereby warm up the fuel cell, if a low-temperature actuation condition is satisfied at a start-up of the fuel cell; and a second step for drying a membrane electrode assembly of the fuel cell, if a power generation capacity of the fuel cell is lower than a predetermined power generation capacity.

In this method of actuating a fuel cell system, if the low-temperature actuation condition is satisfied at the start-up of the fuel cell, the fuel cell is actuated in the low-temperature actuation mode, namely, the fuel cell starts up by the low-temperature actuation, so that a warming-up of the fuel cell is achieved (first step). Further, if the power generation capacity of the fuel cell is lower than the predetermined power generation capacity and it is assumed that an excess amount of water (moisture) exists in the anode and/or the cathode of the membrane electrode assembly (MEA), the membrane electrode assembly is dried (second step). Therefore, the moisture can be removed to recover the power generation capacity of the fuel cell.

Further, since the membrane electrode assembly is dried upon actuation of the fuel cell system, it is possible to decrease the time required for purging after the fuel cell system stops the power generation, that is, the operation time of the compressor. As a result, it is not necessary to enlarge the size of the external power source, which can prevent the whole system from being enlarged in size. In the case of drying the membrane electrode assembly at the start-up, since the compressor can be operated using electric power generated by the fuel cell, it is not necessary to provide a dedicated external power source.

Figure 5:
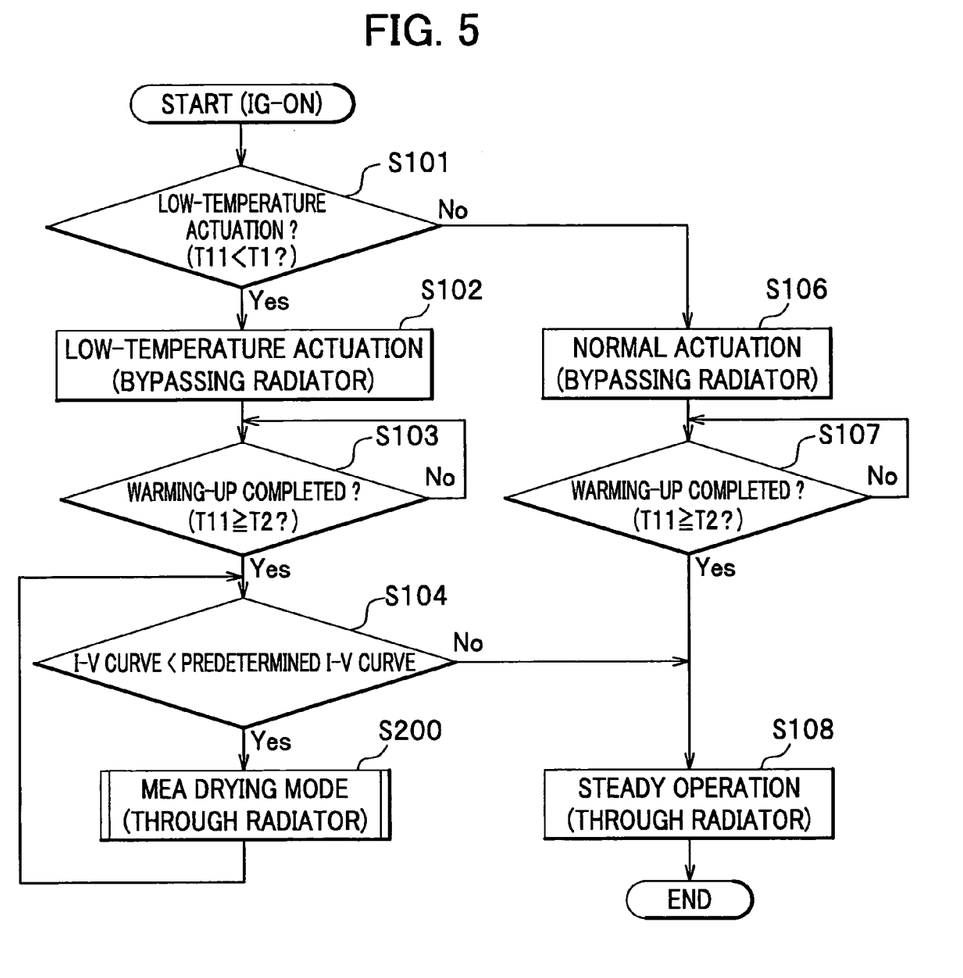
FIG. 5 is a flow chart showing the manner of actuation of the fuel cell system.

In the preferred embodiment to be described later, the low-temperature actuation condition is satisfied if the temperature T11 of the fuel cell 10 at the start-up is lower than a predetermined temperature T1 (see FIG. 5: S101; Yes).

In the above method, the second step may include a further step (second A step) for elevating a temperature of the fuel cell to be higher than in a steady operation of the fuel cell.

According to this actuation method, the temperature of the fuel cell is elevated to be higher than in the steady operation where the fuel cell is driven in a steady operation mode (second A step), and so the temperature of the reaction gas flowing inside the fuel cell rises. As a result, the saturated vapor-point increases and therefore the relative humidity lowers. The moisture (water) in the membrane electrode assembly then easily transfers to the reaction gas so that the membrane electrode assembly can be dried effectively.

The term "steady operation" indicates driving the fuel cell after the temperature of the fuel cell reaches the warming-up completion temperature (e.g., 70° C.) so that the coolant for preventing an excessive temperature rise of the fuel cell circulates in a steady manner (steady operation mode) and the fuel cell is substantially kept at the warming-up completion temperature, thereby stabilizing the output power of the fuel cell.

In the above method, the further step may include a cooling rate decreasing step for decreasing a cooling rate of the fuel cell to be lower than in the steady operation of the fuel cell.

According to this actuation method, the cooling rate of the fuel cell, for instance, by using coolant, etc. is decreased to be lower than in the steady operation of the fuel cell (cooling rate decreasing step), and so the temperature of the fuel cell rises higher than in the steady operation of the fuel cell.

In the above method, the further step may include a gas pressure decreasing step for decreasing a pressure of the reaction gas to be supplied to the fuel cell to be lower than in the steady operation of the fuel cell.

According to this actuation method, if the pressure of the reaction gas to be supplied to the fuel cell is decreased to be lower than in the steady operation of the fuel cell while maintaining a constant flow rate of the reaction gas (gas pressure decreasing step), the flow rate of the reaction gas increases within the fuel cell. Therefore, it is possible to blow off moisture contained in the membrane electrode assembly so that the membrane electrode assembly can be dried.

Further, if the power generation (generation of electricity) is carried out while decreasing the pressure of the reaction gas, the self-generated heat of the fuel cell increases and the temperature of the fuel cell increases as a result. Therefore, the temperature of the reaction gas rises and thus the saturated vapor-point of the reaction gas increases, so that the membrane electrode assembly can be dried in a more reliable manner.

In the above method, the second step may include a step (second B step) for lowering a humidity increase in the reaction gas to be supplied to the fuel cell than in a steady operation of the fuel cell.

According to this actuation method, lowering a humidity increase in the reaction gas to be supplied to the fuel cell than in a steady operation of the fuel cell, and so moisture contained in the membrane electrode assembly transfers to the flowing reaction gas. As a result, the membrane electrode assembly can be dried in a more reliable manner.

In the above method, the second step may include a flow rate increasing step for increasing a flow rate of the reaction gas to be supplied to the fuel cell to be higher than in a steady operation of the fuel cell.

According to this actuation method, the flow rate of the reaction gas is increased to be higher than in the steady operation of the fuel cell (flow rate increasing step), and so moisture within the fuel cell is blown off and is apt to be discharged to the outside. This makes it possible to facilitate drying of the membrane electrode assembly.

Especially, in a case in which the flow rate of a low humidity reaction gas whose humidity increase has been lowered is increased, moisture contained in the membrane electrode assembly is effectively transferred to the reaction gas so that the membrane electrode assembly can be dried in a more reliable manner.

Further, in the above method, the second step may be continued until the power generation capacity of the fuel cell becomes equal to or higher than the predetermined power generation capacity.

According to this actuation method, the second step is continued until the power generation capacity of the fuel cell becomes equal to or higher than the predetermined power generation capacity, namely, the second step is continued as long as the power generation capacity of the fuel cell is lower than the predetermined power generation capacity. This can prevent excessive drying of the membrane electrode assembly. As a result, it is possible to prevent the capacity of the membrane electrode assembly from being deteriorated due to overdrying.

According to another aspect of the present invention, there is provided a fuel cell system comprising: a fuel cell to which reaction gases are supplied to generate electricity; an electric motor connected to and driven by the fuel cell; an anode system for supplying and discharging hydrogen as a reaction gas to and from an anode of the fuel cell; a cathode system for supplying and discharging air containing oxygen as a reaction gas to and from a cathode of the fuel cell; means for actuating the fuel cell in a low-temperature actuation mode to thereby warm up the fuel cell, if a low-temperature actuation condition is satisfied at a start-up of the fuel cell; and means for drying a membrane electrode assembly of the fuel cell after the fuel cell is actuated in the low-temperature actuation mode and before an operation of the fuel cell is stopped, if a power generation capacity of the fuel cell is lower than a predetermined power generation capacity.

In the above fuel cell system, the means for drying the membrane electrode assembly of the fuel cell may elevate a temperature of the fuel cell to be higher than in a steady operation of the fuel cell.

In the above fuel cell system, the means for drying the membrane electrode assembly of the fuel cell may decrease a cooling rate of the fuel cell to be lower than in the steady operation of the fuel cell.

In the above fuel cell system, the means for drying the membrane electrode assembly of the fuel cell may decrease a pressure of the reaction gas to be supplied to the fuel cell to be lower than in the steady operation of the fuel cell.

In the above fuel cell system, the means for drying the membrane electrode assembly of the fuel cell may lower a humidity increase in the reaction gas to be supplied to the fuel cell than in a steady operation of the fuel cell.

In the above fuel cell system, the means for drying the membrane electrode assembly of the fuel cell may increase a flow rate of the reaction gas to be supplied to the fuel cell to be higher than in a steady operation of the fuel cell.

Further, in the above fuel cell system, the membrane electrode assembly of the fuel cell may be continuously dried until the power generation capacity of the fuel cell becomes equal to or higher than the predetermined power generation capacity.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which:

FIG. 3 is a graph showing a relation between temperature and output power of the fuel cell after the ignition IG is on;

DETAILED DESCRIPTION OF THE INVENTION

With reference to the accompanying drawings, one preferred embodiment of the present invention will be described below.

Configuration of Fuel Cell System

Figure 1:
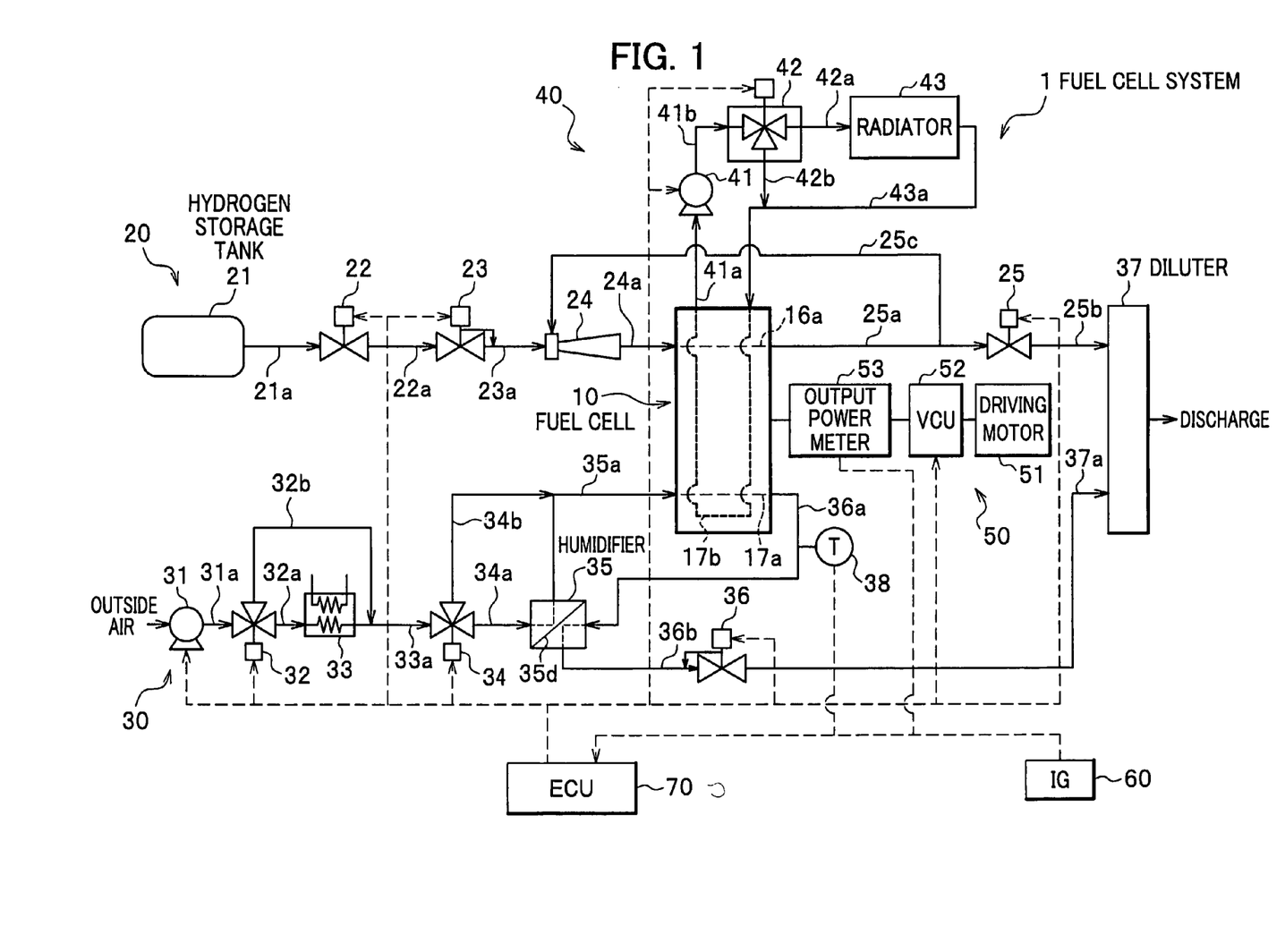
FIG. 1 is a block diagram illustrating the configuration of a fuel cell system according to one aspect of the present invention.

Firstly, a description will be given to a system configuration which implements an actuation method for a fuel cell system according to the present invention. A fuel cell system 1 as shown in FIG. 1 is mounted on a fuel cell vehicle (not shown). The fuel cell system 1 is equipped with a driving motor 51 connected to an output terminal (not shown) of the fuel cell 10. The driving motor is driven by electric power generated by the fuel cell 10 so that the fuel cell vehicle runs.

The fuel cell system 1 mainly consists of the fuel cell 10, an anode system 20 for supplying/discharging hydrogen (fuel gas; reaction gas) to/from an anode 14 (see FIG. 2) of the fuel cell 10, a cathode system 30 for supplying/discharging air containing oxygen (oxidant gas; reaction gas) to/from a cathode 15 (see FIG. 2) of the fuel cell 10, a cooling system 40 for cooling the fuel cell 10, an electric power consumption system 50 which consumes the electric power generated by the fuel cell 10, an ignition (IG) 60 as an actuation switch for the fuel cell system 1, and an ECU (Electronic Control Unit) 70 for electronically controlling these systems and parts to control the fuel cell system 1.

Fuel Cell

Figure 2A:
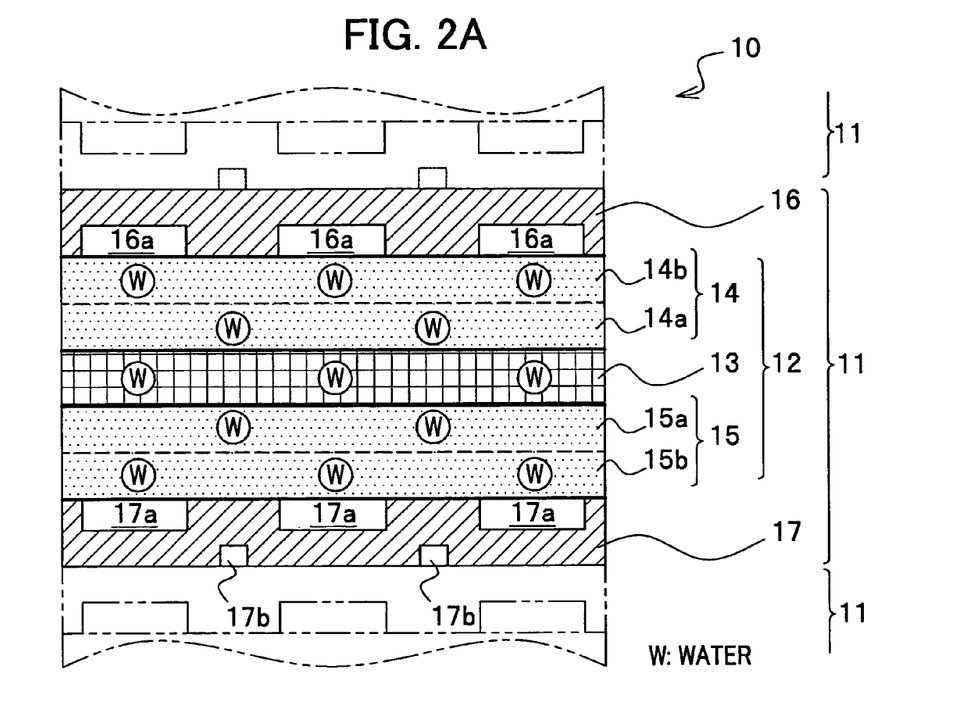
FIG. 2A is a sectional view of a fuel cell shown in FIG. 1, illustrating a state before drying an MEA.

As shown in FIG. 2A, the fuel cell (fuel cell stack) 10 is a polymer electrolyte fuel cell, in which a plurality of single cells 11 are stacked one on another in the vertical (thickness) direction. Each single cell 11 has an MEA (Membrane Electrode Assembly) 12, and metallic separators 16, 17 for sandwiching therebetween the MEA 12. The MEA 12 consists of an electrolyte membrane 13 such as a monovalent cation exchange electrolyte membrane, and an anode 14 and a cathode 15 sandwiching therebetween the electrolyte membrane 13.

The anode 14 has a catalyst portion 14a on the electrolyte membrane 13 side, and a gas-diffusion portion 14b on the separator 16 side. The gas-diffusion portion 14b is made of a conductive porous member such as carbon paper, and a catalyst (e.g. Pt) is carried on the porous member such as carbon paper to form the catalyst portion 14a. Similarly, the cathode 15 has a catalyst portion 15a on the electrolyte membrane 13 side, and a gas-diffusion portion 15b on the separator 17 side.

A large number of continuous voids are provided inside the anode 14 and the cathode 15, and these continuous voids form passages for the reaction gases (hydrogen; air containing oxygen). Therefore, as shown in FIG. 2A, if moisture (water) pools inside the anode 14 and the cathode 15 and closes the continuous voids as the passages, the reaction gases are hardly fed to the catalyst portions 14a, 15a, where the electrode reaction takes place. Therefore, the I-V curve (electricity generation capacity; I-V characteristics; output power) of the single cell 11 lowers, and the I-V curve of the fuel cell 10 as a stack of the single cells 11 also lowers (see FIG. 3). It should be noted that the I-V curve indicates an output current-output voltage curve, and each single cell 11 (fuel cell 10) has a property to generate electricity on a certain I-V curve which dependents on temperature, a supplying condition of the reaction gases, etc.

Figure 2B:
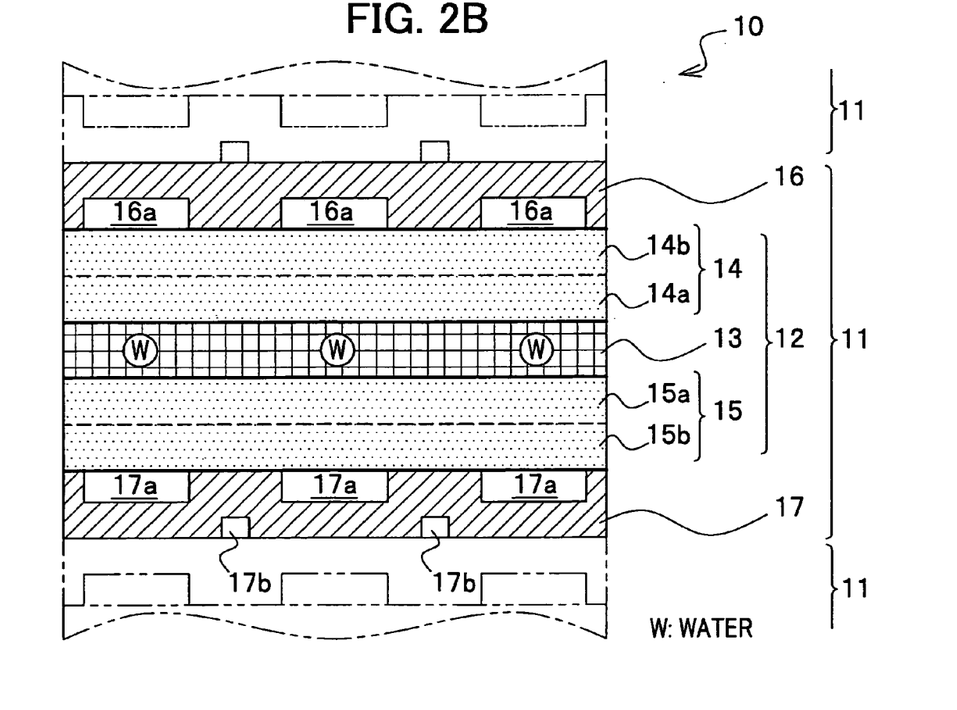
FIG. 2B is a sectional view of the fuel cell, illustrating a state after drying the MEA.

As shown in FIG. 2B, if moisture (water) does not pool inside the anode 14 and the cathode 15, the reaction gases are reliably fed to the catalyst portions 14a, 15a so that each single cell 11 generates electricity on a higher I-V curve. As a result, the fuel cell 10 also generates electricity on a higher I-V curve (see FIG. 3). According to such a fuel cell 10 having higher I-V characteristics, it is possible to obtain a desired fuel cell output power in conformity with the target I-V characteristics.

The separator 16 is positioned on one side of the anode 14 of the MEA 12, and has anode passages (reaction gas passages) 16a for flowing hydrogen so that hydrogen is fed to the anode 14. The separator 17 is positioned on one side of the cathode 15 of the MEA 12, and has cathode passages 17a for flowing air containing oxygen so that air is fed to the cathode 15. When hydrogen and air are supplied, an output power is obtained due to electric potential difference (OCV: Open Circuit Voltage) between the anode 14 and the cathode 15.

Figure 3:
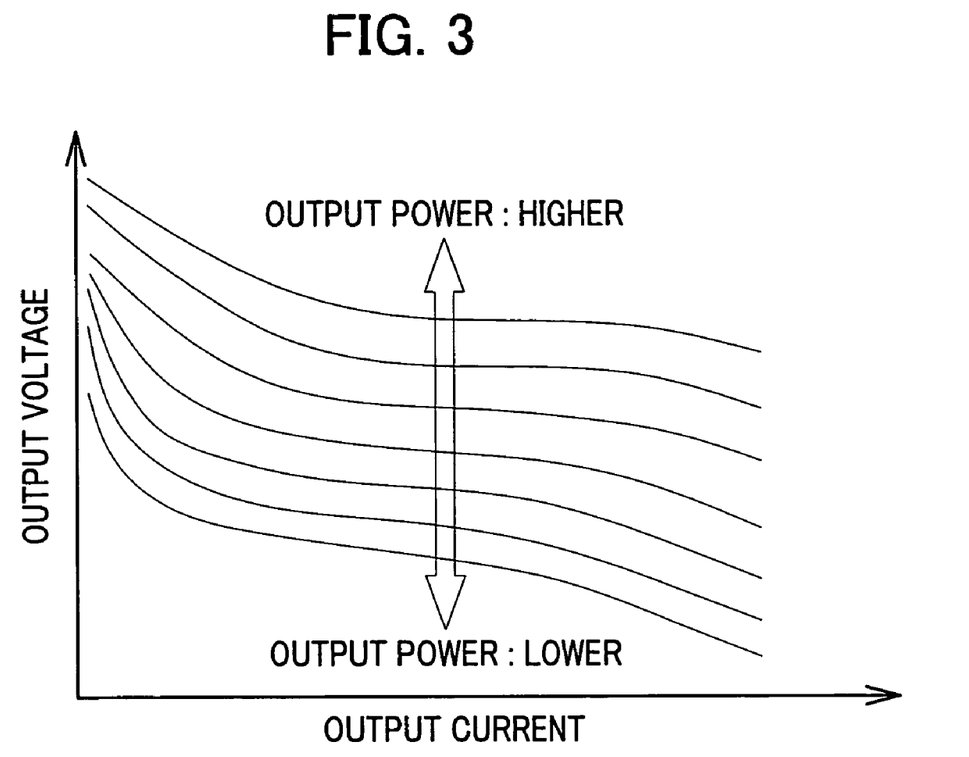

The separator 17 is provided with coolant passages 17b for flowing coolant for the cooling system 40. On the graph as shown in FIG. 3, the OCV corresponds to the output voltage when the output current is zero.

Further, the electric power consumption equipment such as the driving motor 51 is connected to the output terminal of the fuel cell 10 through a VCU (Voltage Control Unit) 52 to be described later. When the electric power consumption equipment requires electricity while the electric potential difference occurs and the VCU 52 is controlled, the MEA 12, that is, the fuel cell 10 generates electricity.

Figure 4:
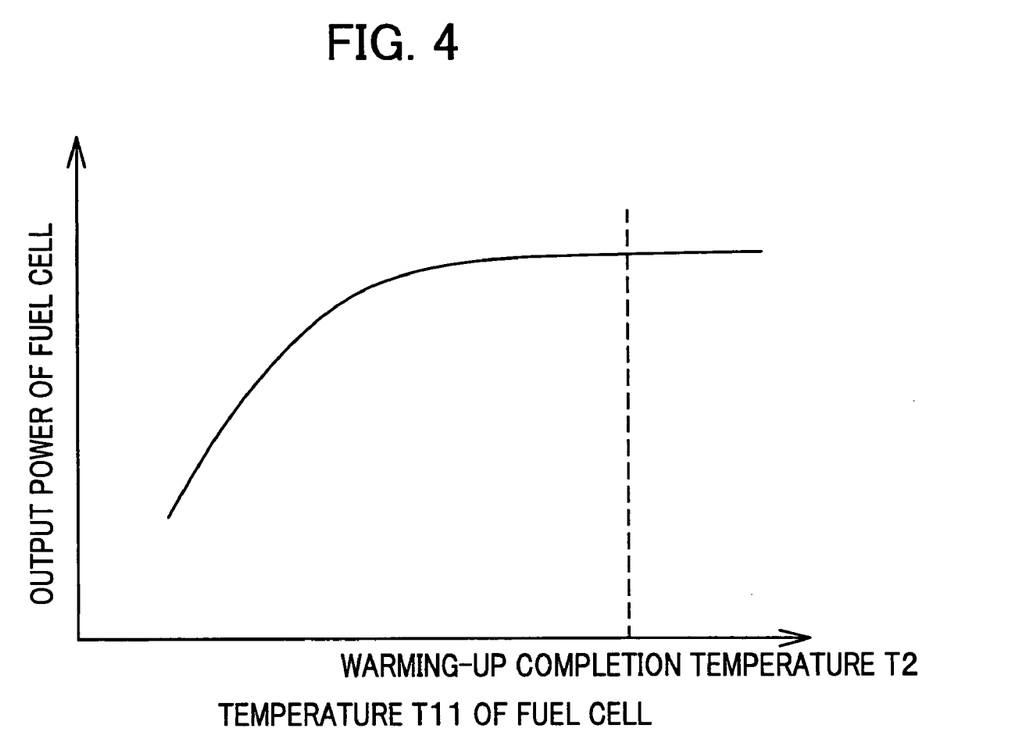
FIG. 4 is a graph showing I-V curve (I-V characteristics) of the fuel cell.

As shown in FIG. 4, the fuel cell 10 has a warming-up completion temperature T2 (e.g. 70° C.) based on the kind or the setting of the fuel cell system 1. The warming-up completion temperature T2 is a threshold temperature above which the output power of the fuel cell 10 is expected to be stabilized, and if the temperature T11 of the fuel cell 10 is equal to or higher than the warming-up completion temperature T2, the catalyst portions 14a, 15a are well-activated.

Anode System

Returning now to FIG. 1, an explanation will be given to the anode system 20.

The anode system 20 mainly includes a hydrogen storage tank 21 for storing hydrogen, a shut-off valve 22, a pressure reducing valve 23 (regulator), an ejector 24, and a purge valve 25.

At upstream of the fuel cell 10 from the hydrogen storage tank 21 toward the anode passage 16a are in turn connected a pipe 21a, the shut-off valve 22, a pipe 22a, the pressure reducing valve 23, a pipe 23a, the ejector 24, a pipe 24a, and the anode passage 16a. When the shut-off valve 22 is opened by the control of the ECU 70, hydrogen is supplied from the hydrogen storage tank 21 to the anode passage 16a during which the pressure of hydrogen is reduced to a predetermined pressure through the pressure reducing valve 23. The pressure reducing valve 23 is electrically connected to the ECU 70. The ECU 70 can therefore adjust the secondary (downstream) pressure of the pressure reducing valve 23 when necessary.

At downstream of the fuel cell 10 from the anode passage 16a toward a diluter 37 are in turn connected a pipe 25a, the open/close type purge valve 25, a pipe 25b, and the diluter 37. Further, an intermediate portion of the pipe 25a and the ejector 24 are connected by a pipe 25c (circulating system).

When the output power of the fuel cell 10 lowers and a large amount of impurities (moisture, etc.) is possibly contained in the anode off-gas discharged from the anode 14, the ECU 70 opens the purge valve 25 so that the anode off-gas is fed to the diluter 37 through the pipe 25a, the purge valve 25, and the like. When the output power of the fuel cell 10 is in a better condition and the anode off-gas possibly contains only a few amount of impurities, the ECU closes the purge valve 25 so that unreacted hydrogen returns to the ejector 24 through the pipe 25c to thereby circulate and effectively utilize hydrogen.

Cathode System

The cathode system 30 mainly includes a compressor 31 (supercharger; oxidant gas supply device), an intercooler 33 (heat exchanger), a humidifier 35 (humidifying device), a backpressure valve 36, the diluter 37, and a temperature sensor 38.

Upstream side of the fuel cell 10 will be described.

The compressor 31 takes in and compresses the outside air and feeds the same as an oxidant gas (purge gas at the time of purging) to the cathode 15 of the fuel cell 10. The compressor 31 is connected to the intercooler 33 through a pipe 31a, an intercooler valve 32 which is a three-way valve, and a pipe 32a. The compressor 31 is also electrically connected to the ECU 70 so that the ECU 70 can control the compressor 31 when necessary.

The intercooler 33 is a heat exchanger for cooling the air whose temperature has been raised as a result of compression by the compressor 31 to a desired temperature. The intercooler 33 is connected to the humidifier 35 through a pipe 33a, a humidifier valve 34 which is a three-way valve, and a pipe 34a.

The intercooler valve 32 and the pipe 33a are connected through a pipe 32b so that the air from the compressor 31 bypasses the intercooler 33. The intercooler valve 32 is also electrically connected to the ECU 70. Opening and closing the intercooler valve 32 under the control of the ECU 70 allows a flow of the air to be guided through or bypassing the intercooler 33.

However, as long as the control on the air flowing through/bypassing the intercooler 33 is performed, the arrangement thereof is not limited to this specific one. For example, the intercooler valve 32 may not be provided, and instead, the pipe 32b for bypassing the intercooler 33 may be provided with a shut-off valve to control the opening/closing operation of the shut-off valve. Furthermore, a flow regulating valve (butterfly valve, etc.) may be provided at an appropriate position to control the flow rate of the air flowing through the intercooler 33 and the flow rate of the air bypassing the intercooler 33.

The humidifier 35 humidifies the air to be fed to the fuel cell 10. The humidifier 35 includes a hollow fiber membrane 35d inside the humidifier 35. The hollow fiber membrane 35d exchanges moisture between the air from the compressor 31 (intercooler 33) and a wet cathode off-gas which contains produced water discharged from the cathode passage 17a. The humidifier 35 is connected to the cathode passage 17a through a pipe 35a.

Further, the humidifier valve 34 and the pipe 35a are connected through a pipe 34b so that the air from the intercooler 33 (compressor 31) can bypass the humidifier 35. The humidifier valve 34 is also electrically connected to the ECU 70. Opening and closing the humidifier valve 34 under the control of the ECU 70 allows a flow of the air to be guided through or bypassing the humidifier 35.

However, as long as the control on the air flowing through/bypassing the humidifier 35 is performed, the arrangement thereof is not limited to this specific one. For example, the humidifier valve 34 may not be provided, and instead, the pipe 34b for bypassing the humidifier 35 may be provided with a shut-off valve to control the opening/closing operation of the shut-off valve. Furthermore, a flow regulating valve (butterfly valve, etc.) may be provided at an appropriate position to control the flow rate of the air flowing through the humidifier 35 and the flow rate of the air bypassing the humidifier 35.

Next, downstream side of the fuel cell 10 will be described.

The cathode passage 17a is connected at the downstream side thereof to the humidifier 35 through a pipe 36a so that a wet cathode off-gas containing a lot of moisture can be fed to the humidifier 35. Since the moisture exchange is performed at the humidifier 35, the cathode off-gas whose water content lowers can be fed to the diluter 37 through the pipe 36b, the backpressure valve 36, and a pipe 37a.

The backpressure valve 36 is a valve which adjusts a backpressure (upstream-side pressure) to a predetermined pressure. The backpressure valve 36 is set such that the backpressure (pressure in the cathode passage 17a within the fuel cell 10) can balance with the pressure in the anode passage 16a during the steady operation of the fuel cell system 1. Therefore, an expansion or breakage of the MEA can be prevented. The backpressure valve 36 is electrically connected to the ECU 70 so that the ECU 70 can control the opening degree of the backpressure valve 36 to thereby adjust the backpressure to a desired level.

The diluter 37 dilutes hydrogen contained in the anode off-gas from the anode system 20, and includes a dilution space inside the diluter 37. The anode off-gas containing hydrogen from the anode system 20 and the cathode off-gas (dilution gas) from the humidifier 35 are guided to the dilution space. Therefore, hydrogen contained in the anode off-gas is diluted with the cathode off-gas and becomes a diluted gas whose hydrogen content is lowered to or below a predetermined level. The diluted gas is then discharged to the atmosphere.

The temperature sensor 38 is provided at the pipe 36a to detect the temperature of the gas inside the pipe 36a as a current temperature T11 of the fuel cell 10 or the fuel cell system 1. The temperature sensor 38 is electrically connected to the ECU 70 so that the ECU 70 can monitor the temperature T11 of the fuel cell 10 or the like.

Cooling System

The cooling system 40 is a system for flowing coolant (ethylene glycol, etc.) through the coolant passage 17b of the fuel cell 10 so as to prevent an excessive temperature rise of the fuel cell 10, which generates heat as a result of power generation. The cooling system 40 cools the fuel cell 10 and keeps the fuel cell 10 at a warming-up completion temperature T2 (see FIG. 4) in a temperature band which is suitable for the steady operation of the fuel cell 10. The cooling system 40 mainly includes a coolant pump 41, a thermostat valve 42, and a radiator 43.

A description will be given to a flow of the coolant in the steady operation during which the fuel cell 10 generates electricity in a steady (normal) manner. During the steady operation, the temperature of the coolant to be discharged from the fuel cell 10 is high. This coolant in turn flows from the coolant passage 17b for the fuel cell 10, the pipe 41a, the coolant pump 41, the pipe 41b, the thermostat valve 42, the pipe 42a, the radiator 43, the pipe 43a, and the coolant passage 17b, so that the fuel cell 10 can be cooled and an excessive temperature rise of the fuel cell 10 can be prevented.

Meanwhile, before the warming-up is completed, namely, at a start-up of the fuel cell system 1 for instance, the temperature of the coolant to be discharged from the fuel cell 10 is low. In this condition, unlike the flow of the coolant in the steady operation, the coolant flows from the thermostat valve 42 to the pipe 43a through the pipe 42b while bypassing the radiator 43.

To be more specific, when the temperature of the coolant discharged from the fuel cell 10 is high after the completion of the warming-up, the thermostat valve 42 is opened to allow the coolant to flow from the pipe 41b to the radiator 43. On the contrary, when the temperature of the coolant discharged from the fuel cell 10 is low at the start-up or the like, the thermostat valve 42 is closed to shut off the flow of the coolant toward the radiator 43. The thermostat valve 42 is constructed such that the temperature for opening the valve can be adjustable. The thermostat valve 42 is electrically connected to the ECU 70 so that the ECU 70 can control the valve-opening temperature.

The coolant pump 41 is also electrically connected to the ECU 70 so that the ECU 70 can control the rotation speed, etc.
Electric Power Consumption System The electric power consumption system 50 mainly includes the driving motor 51 (external load), the VCU (Voltage Control Unit) 52, and an output power meter 53. In parallel with the driving motor 51, there is provided an electricity storage device (not shown) such as a capacitor for storing a surplus power of the fuel cell 10 and for assisting the power generation of the fuel cell 10. The electric power consumption system 50 also includes a motor of the compressor 31. Therefore, the compressor 31 operates using the electric power generated by the fuel cell 10 and the like.

The driving motor 51 is an electric motor for running the fuel cell vehicle. The driving motor 51 is connected to the output terminal of the fuel cell 10 through the VCU 52.

The VCU 52 is a current/voltage controller which controls the power generation of the fuel cell 10 by controlling the output current and the output voltage of the fuel cell 10. In other words, the VCU is equipment which takes out an electric current when necessary and makes the fuel cell 10 generate electricity. The VCU 52 is equipped with a contactor (relay), a DC-DC converter, etc. The VCU 52 is electrically connected to the ECU 70. The ECU 70 can therefore control the output current and the output voltage through the VCU 52. For example, the fuel cell 10 does not generate electricity when the ECU 70 sets the output current to 0 (zero).

The output power meter 53 detects the output current and the output voltage of the fuel cell 10. The output power meter 53 is equipped with an ammeter and a voltmeter. The ammeter and the voltmeter are arranged at predetermined positions of the output power meter 53. The ammeter detects the output current of the fuel cell 10, and the voltmeter detects the output voltage of the fuel cell 10. The output power meter 53 is electrically connected to the ECU 70 so that the ECU 70 can monitor the output current and the output voltage through the output power meter 53.
ECU The ECU (controller) 70 electronically controls the fuel cell system 1. The ECU includes a CPU, a ROM, a RAM, various interfaces, and electronic circuits. Manner of control using the ECU 70 will be described later.

Operation of Fuel Cell System

Figure 6:
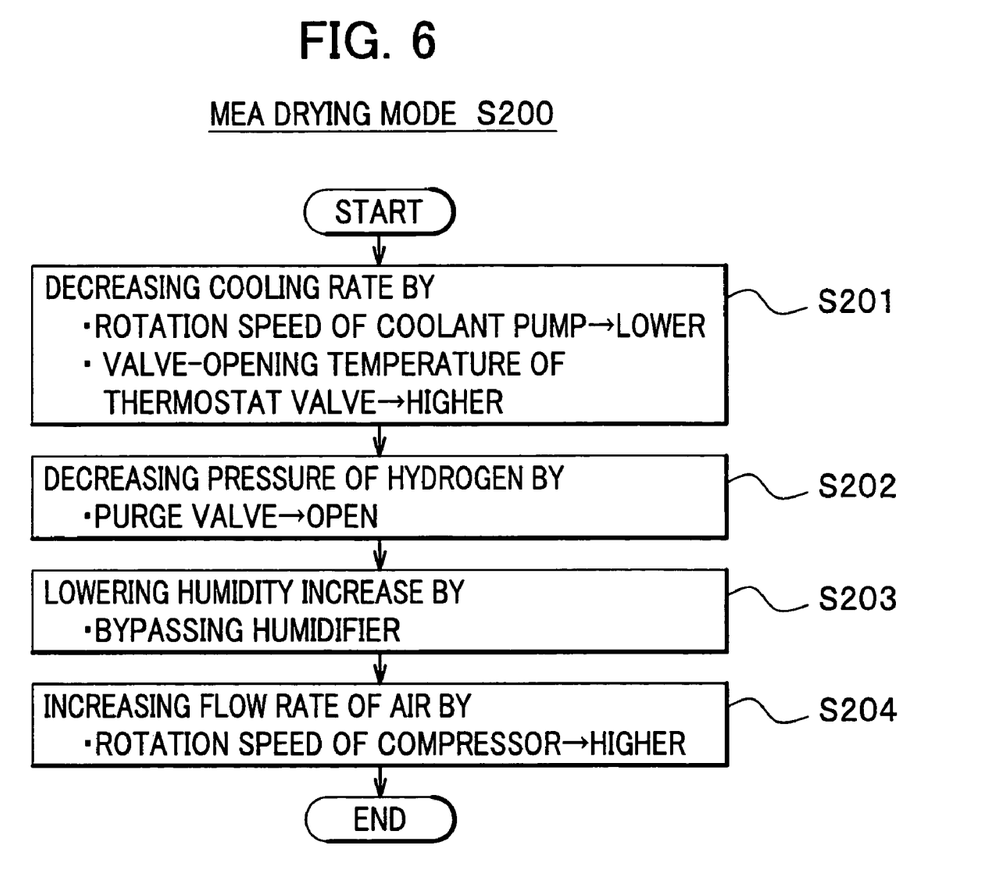
FIG. 6 is a flow chart showing processes in an MEA drying mode of FIG. 5.

Operation of the fuel cell system 1 and manner of actuating (starting up) the fuel cell system 1 according to one embodiment of the present invention will be described mainly with reference to FIGS. 5 and 6.

The manner of actuating the fuel cell system 1 includes a first step for actuating the fuel cell 10 in a low-temperature actuation mode to thereby warm up the fuel cell 10 if a low-temperature actuation condition is satisfied, and a second step for drying the MEA 12 after warming up the fuel cell 10 is completed if the I-V curve (power generation capacity) of the fuel cell 10 is lower than a predetermined I-V curve.
Basic Operation At first, with reference to FIG. 5, a description will be given to the basic operation in the manner of actuating the fuel cell system 1. When the ignition (IG) 60 of the fuel cell vehicle is turned on, the flow chart as shown in FIG. 5 starts.
Determination on Low-Temperature Actuation Mode In step S101, the ECU 70 determines whether or not the low-temperature actuation should be carried out (i.e., the fuel cell 10 should be actuated in the low-temperature actuation mode). To be more specific, the ECU detects the current temperature T11 of the fuel cell 10 through the temperature sensor 38, and then compares the current temperature T11 with the predetermined temperature T1 (e.g., 0° C.) stored in the ECU 70. The predetermined temperature T1 is defined, for instance, as a temperature under which the fuel cell 10 and the fuel cell system 1 may be frozen.

If the temperature T11 of the fuel cell 10 is lower than the predetermined temperature T1 (S101; Yes), the ECU 70 determines that the low-temperature actuation is necessary and the operation proceeds to step S102. If the temperature T11 of the fuel cell 10 is not lower than the predetermined temperature T1 (S101; No), that is, if the temperature T11 is equal to or higher than the predetermined temperature T1, the ECU 70 determines that the low-temperature actuation is not necessary and the operation proceeds to step S106.
Low-Temperature Actuation In step S102, the ECU 70 actuates the fuel cell 10 (fuel cell system 1) in the low-temperature actuation mode.

To be more specific, in the anode system 20, the ECU 70 opens the shut-off valve 22 to supply hydrogen to the anode passage 16a. For example, the purge valve 25 is firstly opened, and after discharging condensate remaining within the passages in the anode system 20, the purge valve 25 is closed to circulate hydrogen.

Meanwhile, in the cathode system 30, the ECU 70 actuates the compressor 31 in the low-temperature actuation mode to supply air containing oxygen to the cathode passage 17a. In the low-temperature actuation mode, comparing with the normal actuation mode to be described later in step S106, the compressor 31 is actuated with higher rotation speed than the rotation speed in the normal actuation mode. The low-temperature actuation mode is a driving mode for supplying air (reaction gas for the low-temperature actuation) to the fuel cell 10 with a flow rate higher than the normal flow rate and with a pressure higher than the normal pressure. Since the fuel cell 10 is actuated in the low-temperature actuation mode and the reaction gas for the low-temperature actuation is supplied to the fuel cell 10, the fuel cell 10 is capable of generating electricity for a higher output.

In this preferred embodiment, the rotation speed of the compressor 31 changes according to the following relation: Low-temperature actuation mode>Normal actuation mode>MEA drying mode>Steady operation mode, wherein the rotation speed is the highest in the low-temperature actuation mode, and the second highest in the normal actuation mode, and the third highest in the MEA drying mode, and the lowest in the steady operation mode.

The rotation speed of the compressor 31 in the low-temperature actuation mode is obtained by experiments or tests to be carried out in advance or the like. Alternatively, the increased rotation speed of the compressor 31 in the low-temperature actuation mode may vary based on the temperature of the fuel cell 10 in such a manner that the lower the temperature T11 of the fuel cell 10, the higher the increased rotation speed becomes.

It is arbitrarily determined whether or not the flow of air passes through the intercooler 33 and/or the humidifier 35 in the low-temperature actuation mode. If the flow of air bypasses the intercooler 33, the warming-up of the fuel cell 10 is facilitated because the air whose temperature has been raised as a result of compression is supplied to the fuel cell 10. If the flow of air bypasses the humidifier 35, it is possible to facilitate removal of unnecessary moisture within the fuel cell 10 using dried air.

When hydrogen and oxygen are supplied to the fuel cell 10, an electric potential difference (OCV) occurs at each of the single cells 11. If the ECU 70 controls the VCU 52 and takes out an electric current from the fuel cell 10, the fuel cell 10 starts to generate electricity. The fuel cell 10 is thus warmed up because of the self-generated heat, and the warming-up is facilitated. It is preferable that the ECU 70 makes the fuel cell 10 generate electricity at a higher output through the VCU 52, thereby increasing the self-generated heat and facilitating the warming-up of the fuel cell 10.

The ECU 70 makes the fuel cell 10 generate electricity as described above and carry out the warming-up, and at the same time, the ECU 70 operates the coolant pump 41 to circulate the coolant. This can prevent a local temperature increase in the fuel cell 10. In order to facilitate the warming-up of the fuel cell 10, it is preferable that the ECU 70 opens the thermostat valve 42 at a high temperature so that the circulating coolant is apt to bypasses the radiator 43.

Determination on Completion of Warming-Up

In step S103, the ECU 70 determines whether or not the warming-up of the fuel cell 10 has been completed. To be more specific, the ECU 70 compares the current temperature T11 of the fuel cell 10 that is detected by the temperature sensor 38 with the warming-up completion temperature T2 (e.g. 70° C.) stored in the ECU 70. If the current temperature T11 is equal to or higher than the warming-up completion temperature T2 (S103; Yes), the ECU 70 determines that the warming-up has been completed and the operation proceeds to step S104. If the current temperature T11 is lower than the warming-up completion temperature T2 (S103; No), the step S103 is repeated.

Determination on MEA Drying Mode

In step S104, the ECU 70 determines whether it is necessary to dry the MEA 12 of the fuel cell 10 even after the completion of the warming-up. To be more specific, the ECU 70 samples the currently output current and the currently output voltage of the fuel cell 10 through the output power meter 53. The ECU 70 then determines the I-V curve (presumptive I-V curve) on which the fuel cell 10 currently generates electricity (see FIG. 3) based on theses sampled output current and output voltage.

Next, the ECU 70 compares this presumptive I-V curve (power generation capacity) with the predetermined I-V curve (predetermined power generation capacity) stored in the ECU 70. If the presumptive I-V curve is lower than the predetermined I-V curve (S104; Yes), the ECU 70 determines that the MEA 12 has to be dried and the operation proceeds to step S200. Herein, the fact that the presumptive I-V curve is lower than the predetermined I-V curve indicates that considering a certain output current value, the output voltage value plotted on the presumptive I-V curve is lower than the output voltage value plotted on the predetermined I-V curve. The predetermined I-V curve is obtained by experiments or tests to be carried out in advance or the like.

More specifically speaking, the presumptive I-V curve of the fuel cell 10 becomes lower even after the completion of the warming-up, in a case in which a large amount of moisture (water vapor) are present in the anode 14 and the cathode 15, which form the MEA 12 (see FIG. 2A), and the reaction gases (hydrogen, air) hardly flow through at the anode 14 and the cathode 15 due to the moisture.

The current I-V curve (presumptive I-V curve) of the fuel cell 10 may not be determined. In this case, the output current and the output voltage are sampled for one point, and then the sampled output current and output voltage are compared with the predetermined I-V curve to determine whether or not the MEA 12 has to be dried.

If the presumptive I-V curve is not lower than the predetermined I-V curve (S104; No), that is, the presumptive I-V curve is equal to or higher than the predetermined I-V curve, the ECU 70 determines that the MEA 12 does not have to be dried and the operation proceeds to step S108. This is a case in which a large amount of moisture are not present at the anode 14 and the cathode of the MEA 12 (see FIG. 2B) and the reaction gases are properly supplied to the catalyst portions 14a, 15a.

In step S200, the ECU 70 drives the fuel cell system 1 in the MEA drying mode, in which the anode 14 and the cathode 15 of the MEA 12 (see FIG. 2A) are mainly dried. The MEA drying mode will be described later for details.

The operation then returns to step S104 and a determination is made whether the presumptive I-V curve (power generation capacity) becomes equal to or higher than the predetermined I-V curve due to drying of the MEA 12 (i.e., removal of moisture). If the presumptive I-V curve is equal to or higher than the predetermined I-V curve (S104; No), the operation proceeds to step S108. In other words, driving of the fuel cell system 1 in the MEA drying mode continues until the I-V curve (power generation capacity) of the fuel cell 10 becomes equal to or higher than the predetermined I-V curve. When the I-V curve (power generation capacity) of the fuel cell 10 becomes equal to or higher than the predetermined I-V curve (predetermined power generation capacity), drying of the MEA 12 in the MEA drying mode is completed. This can prevent a performance degradation of the MEA 12 due to excessive drying.

Normal Actuation Mode

A description will be given to a case in which the temperature T11 of the fuel cell 10 at the start-up (when the ignition (IG) 60 is turned on) is equal to or higher than the predetermined temperature T1 (S101; No) and the operation proceeds to step S106 without low-temperature actuation.

In step S106, the ECU 70 actuates (starts up) the fuel cell 10 (fuel cell system 1) in the normal actuation mode, in which warming-up is less required than in the low-temperature actuation mode. Herein, the controls in the normal actuation mode are substantially the same as those in the low-temperature actuation mode in step S102, except that the rotation speed of the compressor 31 is set to be lower in the normal actuation mode than in the low-temperature actuation mode. When the fuel cell 10 is actuated in the normal actuation mode, air (reaction gas for the normal actuation) is supplied to the cathode passage 17a of the fuel cell 10 with the normal flow rate and with the normal pressure, and after the VCU is properly controlled, the fuel cell 10 normally starts to generate electricity. The warming-up proceeds by the self-generated heat of the fuel cell 10.

Determination on Completion of Warming-Up

Similar to step S103, the ECU 70 determines whether or not the warming-up of the fuel cell 10 has been completed in step S107. If the current temperature T11 of the fuel cell 10 is equal to or higher than the warming-up completion temperature T2 (S107; Yes), the ECU 70 determines that the warming-up has been completed and the operation proceeds to step S108. If the current temperature T11 of the fuel cell 10 is lower than the warming-up completion temperature (step S107; No), the step S107 is repeated.

Steady Operation

After the warming-up has been completed and the presumptive I-V curve becomes equal to or higher than the predetermined I-V curve, in step S108, the ECU 70 makes the fuel cell 10 generate electricity in the steady operation mode. In the steady operation mode, high temperature coolant is discharged from the fuel cell 10, so that the thermostat valve 42 is opened and the coolant flows through the radiator 43.

The operation then proceeds to END and the ECU 70 finishes controlling at the start-up.

MEA Drying Mode

The MEA drying mode in step S200 will be described in detail mainly with reference to FIG. 6

Decrease in Cooling Rate

In step S201 (second A step; cooling rate decreasing step), the ECU 70 decreases the cooling rate of the fuel cell 10 by adjusting the circulating coolant. To be more specific, the rotation speed of the coolant pump 41 is set lower so that the flow rate of the coolant flowing through the fuel cell 10 decreases, and/or the valve-opening temperature for opening the thermostat valve 42 is set higher so that the coolant is apt to bypasses the radiator 43, thereby preventing heat radiation at the radiator 43.

This can decrease the cooling rate of the fuel cell 10 using the coolant. As a result, the temperature T11 of the fuel cell 10 increases due to the self-generated heat caused by the power generation. Therefore, drying of the MEA 12 is facilitated, and moisture is removed mainly from the anode 14 and the cathode 15. The flow passages for the reaction gases (hydrogen, air) can be established in the MEA 12 so that the reaction gases easily reach the catalyst portions 14*a*, 15*a* and the I-V curve (power generation capacity) of the fuel cell 10 recovers.

Decrease in Pressure of Hydrogen

In step S202 (second A step; gas pressure decreasing step), the ECU 70 opens the purge valve 25 to decrease the pressure of hydrogen in the anode passage 16*a*. The manner of opening the purge valve 25 may be controlled by any known manner. For instance, the purge valve 25 may be opened at one time or intermittently. Other than those above, a pressure sensor for detecting the pressure within the anode passage 16*a* may be provided and the purge valve 25 may be kept open until the pressure within the anode passage 16*a* becomes equal to or lower than a predetermined pressure.

The flow velocity of hydrogen that flows through the anode passage 16*a* increases in cooperation with the opening operation of the purge valve 25. This allows moisture contained in the anode passage 16*a* and the anode 14 to be blown off, so that the moisture is apt to be discharged from the fuel cell 10 and drying of the MEA 12 can be facilitated.

When the fuel cell 10 generates electricity while lowering the pressure of hydrogen within the anode passage 16*a*, it is possible to increase the self-generated heat of the fuel cell 10. As a result, the temperature T11 of the fuel cell 10 increases and the drying of the MEA 12 can be facilitated.

Figure 7:
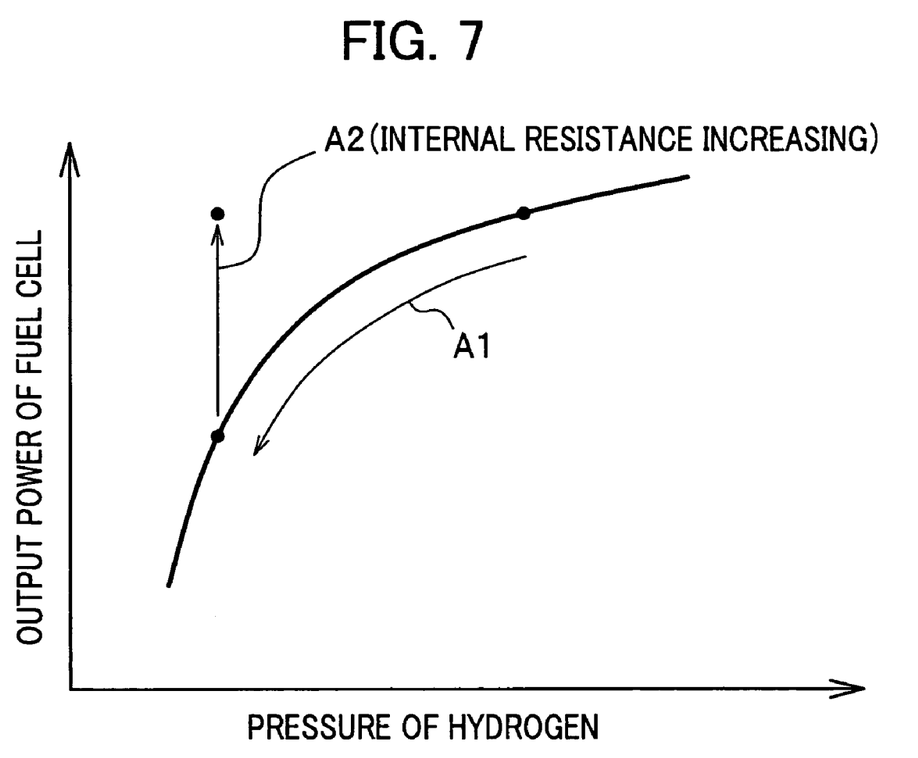
FIG. 7 is a graph showing a relation between pressure of hydrogen and output power of the fuel cell.

As one reason why the self-generated heat of the fuel cell 10 increases, an increase in the internal resistance of the fuel cell 10 can be considered. Namely, when an electric current is taken out from the fuel cell 10 by controlling the VCU 52 and at the same time the fuel cell 10 generates electricity before and after the pressure decrease, as schematically shown in FIG. 7, the output power of the fuel cell 10 decreases temporarily in accordance with the decrease in the pressure of hydrogen. See arrow A1 of FIG. 7. However, since the VCU 52 makes the fuel cell 10 generate electricity as before the pressure decrease (see arrow A2), the internal resistance of the fuel cell 10 increases.

Lowering Humidity Increase

In step S203 (second B step), the ECU 70 controls the humidifier valve 34 so that air from the compressor 31 bypasses the humidifier 35. This makes it possible to supply the cathode passage 17*a* with an air whose humidity increase lowers than in the steady operation (FIG. 5; S108), that is, a dried air. Therefore, drying of the MEA 12 can be facilitated and moisture can be removed mainly from the cathode 15.

Increase in Air Flow Rate

In step S204 (second B step; flow rate increasing step), the ECU 70 increases the rotation speed of the compressor 31 to be higher than the rotation speed in the steady operation so that the flow rate of air supplied to the cathode passage 17*a* can be increased than in the steady operation. This makes it possible to supply dried air to the cathode passage 17*a* with an increased flow rate. As a result, drying of the MEA 12 can be facilitated and moisture can be removed mainly from the cathode 15. The compressor 31 is driven by the generated power of the fuel cell 10.

While increasing the flow rate of air as described above, the ECU 70 may open the backpressure valve 36 with a valve-opening degree larger than in the steady operation, so that the flow rate of air within the cathode passage 17*a* can be increased to facilitate drying of the MEA 12. It is preferable that the valve-opening degree of the backpressure valve 36 is set such that even if the flow rate of air is increased, the pressure within the cathode passage 17*a* is lower than in the steady operation.

Further, it is preferable that the ECU 70 controls the intercooler valve 32 such that air from the compressor 31 bypasses the intercooler 33. This allows the air whose temperature has been raised as a result of compression by the compressor 31 to be supplied to the cathode passage 17*a*. Therefore, the temperature T11 of the fuel cell 10 increases (second A step) and drying of the MEA 12 can be facilitated.

According to the fuel cell system 1 and the method of actuating the fuel cell system 1 as described above, if an excessive amount of moisture presumably exists at the anode 14 and/or the cathode 15 of the MEA 12, drying of the MEA 12 is performed to recover the I-V curve (power generation capacity) of the fuel cell 10.

Figure 8:
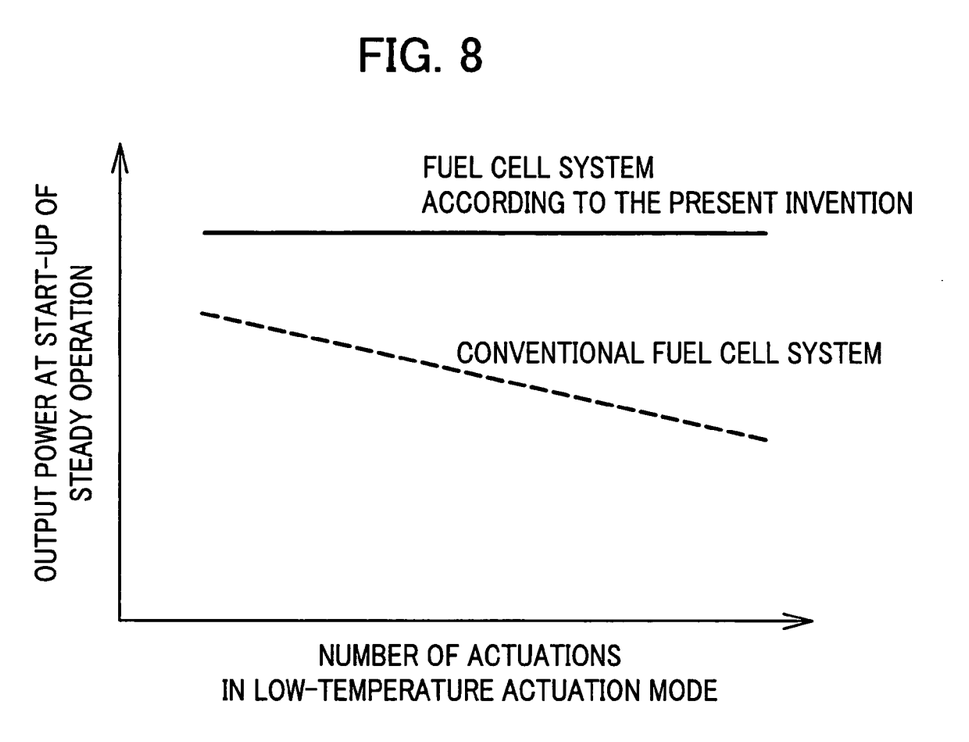
FIG. 8 is a graph showing a relation between the number of low-temperature actuations and output power of the fuel cell.

As shown in FIG. 8, according to the conventional fuel cell system, if the low-temperature actuation, in which the fuel cell 10 generates electricity at a higher output, is repeated, a large amount of water is generated as a result of the power generation at a higher output and this water accumulates at the MEA 12. Therefore, as the number of actuations in the low-temperature actuation mode increases, the output of the fuel cell 10 at the start-up of the steady operation decreases accordingly. However, according to the present invention, the MEA drying mode is performed after the fuel cell 10 is actuated in the low-temperature actuation mode and the warming-up is completed. Therefore, the output power of the fuel cell 10 does not lower even if the number of actuations in the low-temperature actuation mode increases.

Figure 9:
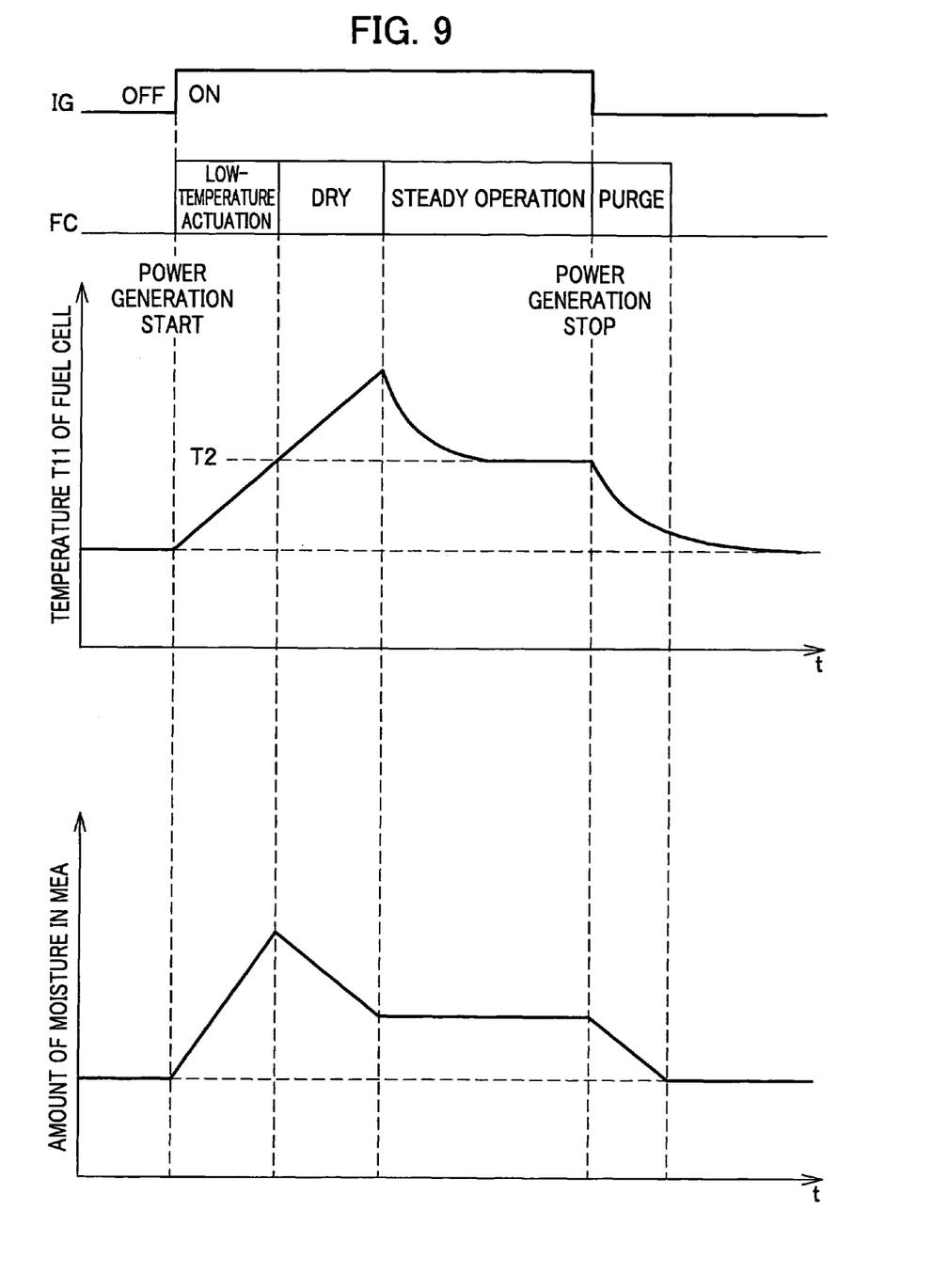
FIG. 9 is a time chart showing an example of operating the fuel cell system according to the present invention.
Figure 10:
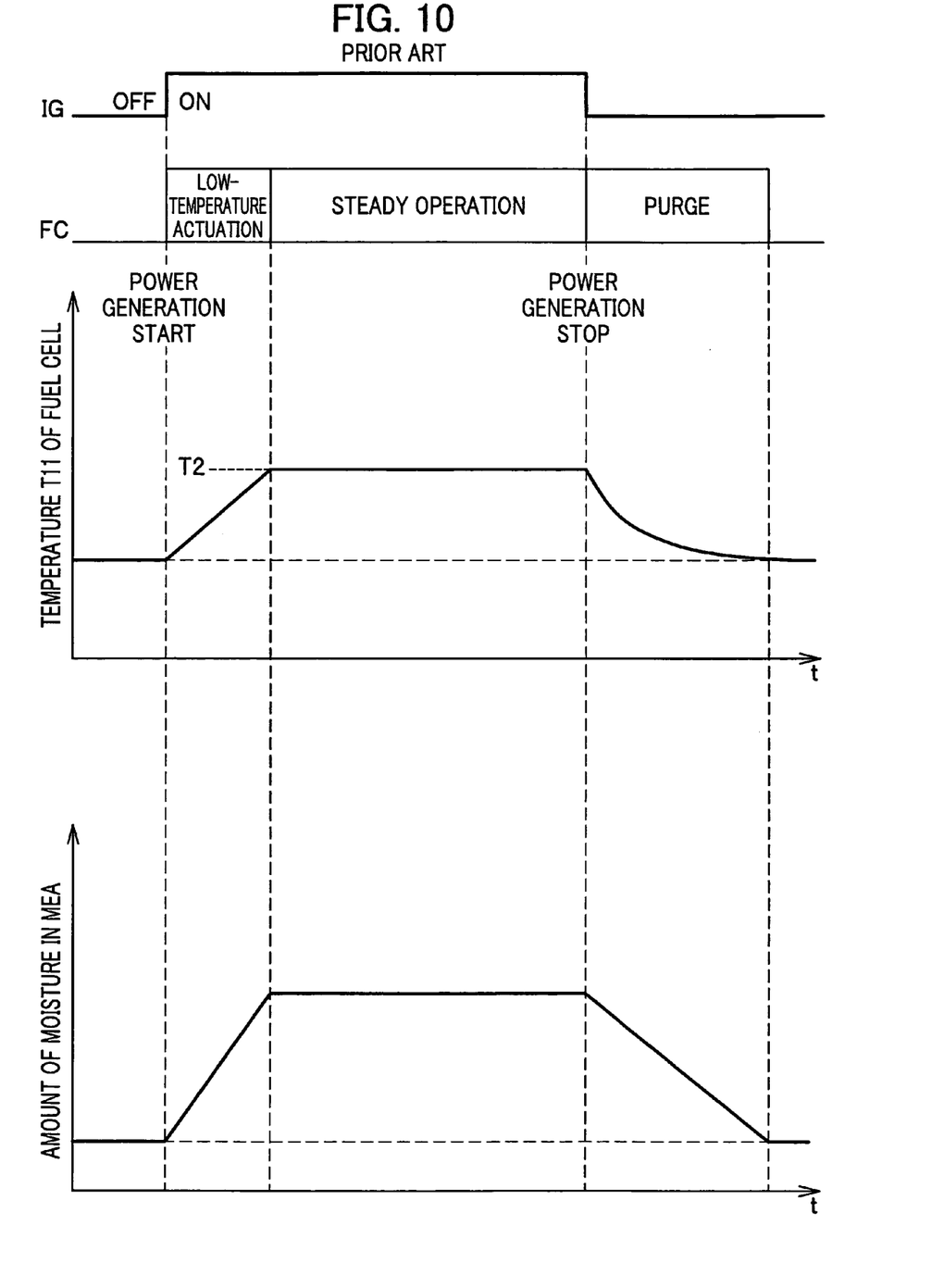
FIG. 10 is a time chart showing an example of operating the conventional fuel cell system as a comparative example.

Further, as shown in FIG. 9, the fuel cell system 1 according to the present invention can reduce the purging time (operation time for the compressor 31) when compared with the conventional fuel cell system (FIG. 10) which firstly dries the MEA 12 at the start-up of the fuel cell system 1, and if excessive moisture accumulates, then dries the MEA 12 by purging after the power generation is stopped. To be more specific, the fuel cell system 1 according to the present invention makes it possible to stop the compressor 31 at an earlier timing to restrict the operation noise. Further, even if excessive moisture is contained in the MEA 12 at the start-up, the fuel cell system 1 according to the present invention performs the MEA drying mode and dries the MEA 12 when necessary to thereby recover the output power of the fuel cell 10.

In the fuel cell system 1 according to the present invention, the pipe 35a and the pipe 22a are connected through a purging pipe (not shown) provided with a purge valve (not shown). The shut-off valve 22 is closed during the purging, and while operating the compressor 31, the purge valve is opened. A purge gas (unhumidified air) is therefore supplied to the anode passage 16a and the cathode passage 17a and purging is performed.

Furthermore, in order to dry the MEA 12 at the start-up, the fuel cell 10 can be used as a power supply for operating the compressor 31. Therefore, it is not necessary to enlarge the size of the power supply for operating the compressor 31, which can prevent the fuel cell system 1 from being enlarged in the size.

While the present invention has been described in detail with reference to one preferred embodiment thereof, it is to be understood that various changes and modifications may be made without departing from the spirit of the invention.

In the above embodiment, the predetermined I-V curve (predetermined power generation capacity) is fixed as a reference to determine whether or not the MEA drying mode is required (step S104). However, the predetermined I-V curve may be set in consideration of the total power generation time of the fuel cell 10, degradation of the MEA 12 due to the low-temperature actuation, etc. For example, if the determination in step S104 is No and the operation proceeds to the steady operation mode (step S108), a correction value representing degradation or the like may be subtracted from the I-V curve in the steady operation mode to obtain a predetermined I-V curve. The thus obtained predetermined I-V curve is stored in the ECU 70, and at the next actuation of the fuel cell system 1, this predetermined I-V curve may be the reference to determine whether or not the MEA drying mode is required.

In the above embodiment, if the operation proceeds to step S204 in the MEA drying mode, air supplied to the cathode passage 17a is increased in the amount and decreased in the pressure. However, in addition to or in an alternative to this control, a further control may be made in the anode side. That is, hydrogen supplied to the anode passage 16a may be increased in the amount and decreased in the pressure. To be more specific, the secondary pressure of the pressure reducing valve 23 may be set to a higher value while the purge valve 25 is kept opened.

In the above embodiment, as the gas pressure decreasing step in the MEA drying mode, the purge valve 25 is opened to decrease the pressure of hydrogen. However, it is also possible to increase the degree of opening of the backpressure valve 36, which is provided at downstream of the fuel cell 10 in the cathode system 30, to decrease the pressure of the air within the cathode passage 17a.

In the above embodiment, the humidifier 35 is provided in the cathode system 30. However, a humidifier may also be provided in the anode system 20 to humidify hydrogen to be supplied to the anode 14. In this instance, a pipe is provided bypassing the humidifier, and when lowering a humidity increase in step S203, a flow of hydrogen bypasses the humidifier.

In the above embodiment, as a case in which a low-temperature actuation condition is satisfied as defined in the claims, there is shown an example in which the temperature T11 of the fuel cell 10 is lower than the predetermined temperature T1 when the ignition (IG) 60 is turned on. However, notwithstanding the temperature T11 of the fuel cell 10 at a time when the IG 60 is turned on, the low-temperature actuation may be performed, for example, by the following sequence. Namely, if the temperature T11 of the fuel cell 10 becomes lower than the predetermined temperature T1 during the stoppage of the fuel cell system 1, a flag is raised. When the fuel cell system 1 is actuated, the ECU 70 checks whether or not the flag is raised. If the flag is raised, the ECU 70 determines that the low-temperature actuation condition is satisfied and performs the low-temperature actuation mode.

Further in the above embodiment, the rotation speed of the compressor is increased in the low-temperature actuation mode than in the normal actuation mode. However, the following controls (1) to (4) may be made alone or in combination.

(1) The pressure reducing valve 23 arranged in the anode system 20 between the shut-off valve 22 and the ejector 24 may be controlled to increase the secondary (downstream) pressure thereof, so that high pressure hydrogen can be supplied to the anode 14 of the fuel cell 10.

(2) The interval for opening the purge valve 25 may be shortened, so that the concentration of hydrogen to be supplied to the anode 14 can be increased.

(3) The backpressure valve 36 provided in the cathode system 30 at downstream of the fuel cell 10 may be controlled to increase the backpressure thereof, so that high pressure air can be supplied to the cathode 15 of the fuel cell 10.

(4) The cell-voltage protection threshold valve for protecting single cells 11 which form the fuel cell 10 may be set to a higher value.

Further, in the above embodiment, the present invention has been described as the fuel cell system 1 mounted on a vehicle. However, the present invention is not limited to this embodiment, and may be adapted to a household stationary-type fuel cell system, a fuel cell system built in a hot water supply system, or the like.

What is claimed is:

1. A method of actuating a fuel cell system equipped with a fuel cell, to which reaction gases are supplied for generating electricity, the method comprising the steps of:
a first step for actuating the fuel cell in a low-temperature actuation mode to thereby warm up the fuel cell, if a low-temperature condition is satisfied at a start-up of the fuel cell, warming up of the fuel cell being completed when a current temperature of the fuel cell is equal to or higher than a warming-up completion temperature;
a second step for drying a membrane electrode assembly of the fuel cell during fuel cell start-up after warming up of the fuel cell is completed, the second step performed only if power generation capacity of the fuel cell is lower than a predetermined power generation capacity, and the second step is not performed if the power generation capacity of the fuel cell is higher than the predetermined power generation capacity;

a third step for generating electricity in a steady operation mode if the power generation capacity of the fuel cell is equal to or higher than the predetermined power generation capacity; and determining if the power generation capacity of the fuel cell is lower than the predetermined power generation capacity by:

generating a current/voltage (I-V) curve by sampling a currently output current and a currently output voltage;

comparing the I-V curve to a predetermined I-V curve; and determining that the power generation capacity of the fuel cell is lower than the predetermined power generation capacity if the I-V curve is lower than the predetermined I-V curve.

2. The method according to claim 1, wherein the second step includes a further step for elevating a temperature of the fuel cell to be higher than in a steady operation of the fuel cell.

3. The method according to claim 2, wherein the further step includes a cooling rate decreasing step for decreasing a cooling rate of the fuel cell to be lower than in the steady operation of the fuel cell.

4. The method according to claim 2, wherein the further step includes a gas pressure decreasing step for decreasing a pressure of the reaction gas to be supplied to the fuel cell to be lower than in the steady operation of the fuel cell.

5. The method according to claim 1, wherein the second step includes a step for lowering a humidity increase in the reaction gas to be supplied to the fuel cell than in a steady operation of the fuel cell.

6. The method according to claim 1, wherein the second step includes a flow rate increasing step for increasing a flow rate of the reaction gas to be supplied to the fuel cell to be higher than in a steady operation of the fuel cell.

7. The method according to claim 1, wherein the second step is continued until the power generation capacity of the fuel cell becomes equal to or higher than the predetermined power generation capacity.

* * * * *